(12) United States Patent  
Okayama

(10) Patent No.: US 9,151,901 B2
(45) Date of Patent: Oct. 6, 2015

(54) WAVELENGTH-SELECTIVE PATH-SWITCHING ELEMENT

(71) Applicant: Oki Electric Industry Co., Ltd., Tokyo (JP)

(72) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 231 days.

(21) Appl. No.: 13/777,424

(22) Filed: Feb. 26, 2013

(65) Prior Publication Data

US 2013/0223791 A1 Aug. 29, 2013

(30) Foreign Application Priority Data

Feb. 27, 2012 (JP) ................................. 2012-039575

(51) Int. Cl.
| | | |
|---|---|---|
| *G02B 6/26* | (2006.01) | |
| *G02B 6/35* | (2006.01) | |
| *G02B 6/12* | (2006.01) | |
| G02B 6/122 | (2006.01) | |
| G02B 6/28 | (2006.01) | |
| G02B 6/293 | (2006.01) | |

(52) U.S. Cl.
CPC ............ *G02B 6/354* (2013.01); *G02B 6/12007* (2013.01); *G02B 6/1228* (2013.01); *G02B 6/2813* (2013.01); *G02B 6/29332* (2013.01)

(58) Field of Classification Search
None
See application file for complete search history.

(56) References Cited

U.S. PATENT DOCUMENTS

| 4,860,294 A | 8/1989 | Winzer et al. |
| 5,764,826 A | 6/1998 | Kuhara et al. |
| 5,960,135 A | 9/1999 | Ozawa |
| 7,072,541 B2 | 7/2006 | Kim et al. |

(Continued)

FOREIGN PATENT DOCUMENTS

| JP | 63-155828 A | 6/1988 |
| JP | 04-212108 A | 8/1992 |
| JP | 06-201942 A | 7/1994 |

(Continued)

OTHER PUBLICATIONS

Serge Bidnyk et al., "Silicon-on-Insulator-Based Planar Circuit for Passive Optical Network Applications", IEEE Photonics Technology Letters, vol. 18, No. 22, Nov. 15, 2006, pp. 2392-2394.

(Continued)

*Primary Examiner* — Sung Pak
(74) *Attorney, Agent, or Firm* — Rabin & Berdo, P.C.

(57) ABSTRACT

A wavelength-selective path-switching element has a silicon substrate on which a pattern of optical waveguides including a first optical waveguide, a second optical waveguide and an intermediary optical waveguide is formed. The widths $W_1$, $W_2$, and $W_3$ of these optical waveguides, lengths $L_1$, $L_2$, and spacing $G_1$, $G_2$ are so set that light of a first wavelength entered into the first optical waveguide propagates on the first, intermediary, and second optical waveguides, exits from the second waveguide, propagates on an output waveguide, and is outputted and that light of a second wavelength entered into the first waveguide after propagating on an input waveguide is outputted from this first waveguide. The wavelength-selective path-switching element can be easily fabricated at low cost and have no light leaking out.

10 Claims, 10 Drawing Sheets

(56) References Cited

U.S. PATENT DOCUMENTS

| | | | |
|---|---|---|---|
| 2003/0118270 A1* | 6/2003 | Miyano et al. | 385/15 |
| 2009/0162014 A1* | 6/2009 | Shiraishi et al. | 385/45 |

FOREIGN PATENT DOCUMENTS

| | | |
|---|---|---|
| JP | 08-163028 A | 6/1996 |
| WO | WO-2011/044317 A2 | 4/2011 |

OTHER PUBLICATIONS

Ning-Ning Feng et al., "Low-Loss Polarization-Insensitive Silicon-on-Insulator-Based WDM Filter for Triplexer Applications", IEEE Photonics Technology Letters, vol. 20, No. 23, Dec. 1, 2008, pp. 1968-1970.

Hsu-Hao Chang et al., "Integrated hybrid silicon triplexer", Optics Express, vol. 18, No. 23, Nov. 8, 2010, pp. 23891-23899.

* cited by examiner

WAVELENGTH-SELECTIVE PATH-SWITCHING ELEMENT

BACKGROUND OF THE INVENTION

1. Field of the Invention

The present invention relates to a wavelength-selective element and specifically to a wavelength-selective element for switching the active optical path based on wavelength differences.

2. Description of the Background Art

Optical communication systems have various types. For example, a passive optical network (PON) communication system has been widely used, in which an optical line terminal (OLT) arranged in a communication carrier connects to a plurality of optical network units (ONUs) located on subscriber premises via optical fibers and star couplers so as to form an optical access system where the OLT is shared among the ONUs. In this system, a wavelength of optical signals used in communications for down-stream direction, i.e. down-stream communication, from the OLT to the ONUs is made different from a wavelength of optical signals used in communications for up-stream direction, i.e. up-stream communication, from the ONUs to the OLT in order to prevent interference of lightwaves from occurring between the down-stream and up-stream communications.

Each of OLT and ONUs is configured such that it includes optical elements such as a wavelength filter, a photodiode, a laser diode and so on. In order to spatially couple the optical components by using a lens, there needs a complex process for aligning respective optical axis, i.e. for aligning the center positions (light-receiving positions or light-emissive positions) of the optical elements. Accordingly, a simplified process is required which can lead to mass-producibility.

For such a simplified process, there is an available way to use an optical waveguide instead of the lens to couple spatially the optical components as disclosed by U.S. Pat. No. 4,860,294 B2 to Winzer, et al., U.S. Pat. No. 5,764,826 B2 to Kuhara, et al., U.S. Pat. No. 5,960,135 B2 to Ozawa, U.S. Pat. No. 7,072,541 B2 to Kim, et al., and Japanese patent laid-open publication No. 163028/1996, for example. They use the optical waveguide instead of the lens to couple the optical components and provide a path-switching element having mass-producibility.

The path-switching element has a function of switching between a path for optical signals in the down-stream communications and a path for optical signals in the up-stream communications. Specifically, the path-switching element selectively activates an optical path for optical signals used in the down-stream communications and an optical path for optical signals used in the up-stream communications so as to send the respective optical signals into a common single optical fiber. The path-switching element also has a function of a wavelength filter because it switches between the path for optical signals in the down-stream communications and the path for optical signals in the up-stream communications according to difference in wavelength.

In the case where the optical components are coupled by using the optical waveguide, light is allowed to propagate while confined within the optical waveguide whereby there is no necessity to do the above complex process which is required when the lens is used. By forming register marks for the optical components such as a wavelength filter, a photo-diode, a laser diode and so on in a chip where the optical waveguide is formed, it is easy to place the respective centers of the optical elements to the optimum positions. Accordingly, by using the optical waveguide, it is possible to fabricate the path-switching elements having mass-producibility.

Such a path-switching element in the ONU and OLTs forming the PON communication system is tried to be constituted by a silicon wire optical waveguide which is made of silicon (Si) adapted for miniaturization and mass production as disclosed in Serge Bidnyk, et al., "Silicon-on-Insulator-Based Planar Circuit for Passive Optical Network Applications", IEEE Photonics Technology Letters, vol. 18, No. 22, Nov. 15, 2006, pp. 2392-2394; Ning-Ning Feng, et al., "Low-Loss Polarization-Insensitive Silicon-on-Insulator-Based WDM Filter for Triplexer Applications", IEEE Photonics Technology Letters, vol. 20, No. 23, Dec. 1, 2008, pp. 1968-1970; and Hsu-Hao Chang, et al., "Integrated hybrid silicon triplexer", Optics Express, vol. 18, No. 23, Nov. 8, 2010, pp. 23891-23899, for example.

The silicon wire optical waveguide is also referred to as a silicon nanowire optical waveguide and has the structure where a silicon optical waveguide (core) is surrounded by a material (cladding layer) such as silicon oxide ($SiO_2$) having its refractive index smaller than silicon. The refractive index of the silicon oxide forming the cladding layer is so different from the refractive index of the silicon forming the core that it is possible to confine almost all of optical electric field components within the core and hence to reduce the cross-sectional dimension of the core to a quite small size, for example, in the order of submicrons. Furthermore, the silicon wire optical waveguide can be made by using common processes for fabricating semiconductor devices or chips and thus be easily mass-produced.

In the case where the optical path-switching element is constituted by the silicon wire optical waveguide, a diffraction grating is commonly used for implementing the above-mentioned function of the wavelength filter and there is a necessity to fabricate a diffraction grating having much shorter period than the wavelength of the optical carrier wave of optical signals whose path will be switched by the path-switching element including the diffraction grating. For fabricating such a diffraction grating, however, a sophisticated technique is required due to its microscopic structure.

Also, there is a phenomenon where light components having wavelengths shorter than the Bragg reflection wavelength of the diffraction grating are given off to the outside from an optical waveguide forming the diffraction grating. It is therefore necessary to prevent the light components from radiating to the outside in some way or other when the path-switching device having the diffraction grating is mounted in an ONU or OLTs.

SUMMARY OF THE INVENTION

It is an object of the present invention to provide a wavelength-selective path-switching element that has no minute or microscopic structure and thereby can be fabricated easily at low cost and does not emit light to the outside.

In accordance with the present invention, attention is given to the fact that the coupling length of an optical directional coupler is determined depending on wavelength to implement a wavelength-selective path-switching element having a first optical waveguide, a second optical waveguide and an intermediary optical waveguide arranged between the first and second optical waveguides. The first and intermediary optical waveguides is arranged substantially close and parallel to each other and cooperates to form a first optical directional coupler. The second and intermediary optical waveguides is arranged substantially close and parallel to each other and cooperates to form a second optical directional coupler.

The wavelength-selective path-switching element according to the invention has light of a first wavelength entered into the first optical waveguide, propagating on the first optical waveguide, intermediary optical waveguide and second optical waveguide, and exiting from the second optical waveguide. The wavelength-selective path-switching element also has light of a second wavelength entered into the first optical waveguide and exiting from the first optical waveguide.

Accordingly, by setting the coupling lengths of the first and second optical directional couplings to their coupling lengths at the first wavelength and rendering the light of the second wavelength unpassing from the first optical waveguide to the intermediary optical waveguide, it is possible to implement the path-switching element which can switch between an optical signal of the first wavelength and an optical signal of the second wavelength arrives, and specifically can select the optical signal of the first wavelength or the optical signal of the second wavelength.

The wavelength-selective path-switching element according to the invention is also so configured that the first and second optical waveguides are arranged on opposite sides of the intermediary optical waveguide and thus does not require diffraction grating. Accordingly, it is not necessary to provide a fine structure (i.e., a diffraction grating) whereby sophisticated technique is not needed during manufacturing.

Furthermore, the wavelength-selective path-switching element according to the invention has the first, second and intermediary optical waveguides fabricated as optical waveguides of silicon in the same layer whereby it is possible to reduce the number of manufacturing steps and to implement the wavelength-selective path-switching element being easily fabricated at low cost. In addition, since there is no diffraction grating, the light is not radiated to the outside from the optical waveguides.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
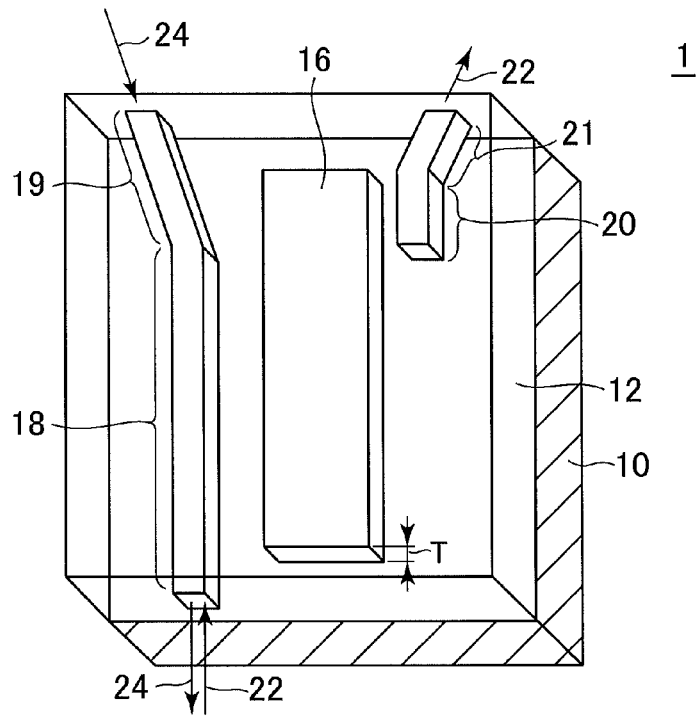
FIG. 1 is a schematics perspective view showing a wavelength-selective path-switching element according to a preferred embodiment of the invention.

Now, a preferred embodiment of the present invention will be described in detail with reference to accompanying drawings. In the figures, the components and elements are merely schematically depicted to the extent that the present invention can be sufficiently understood. Therefore, the present invention is not to be restrictively comprehended only by the illustrated embodiment. In the description and drawings, like components and elements are designated with the same reference numerals, and repetitive descriptions thereon will be refrained from.

FIG. 1 shows a wavelength-selective path-switching element 1, such as a wavelength-selective demultiplexing-multiplexing element, which includes a circuit board 10 of silicon on which a pattern structure of optical waveguides is formed for constituting the wavelength-selective path-switching. The pattern structure is constituted by an optical waveguide pattern of Si and a cladding layer 12 of $SiO_2$, which surrounds the optical waveguide pattern being a core. In this way, the pattern structure is configured to include the core of Si and cladding layer of $SiO_2$ surrounding the core, and hence may also be referred to as a silicon wire optical waveguide or a silicon nanowire optical waveguide.

In the illustrative embodiment, the pattern structure is made out of a SOI (Silicon-On-Insulator) substrate which is widely available on the market. The SOI substrate has a silicon substrate on which a silicon oxide layer is formed. On the silicon oxide layer, a silicon layer is formed which has a thickness equal to the thickness of the optical waveguides.

For making the pattern structure constituting the wavelength-selective path-switching element 1 on the SOI substrate, the following steps are used for example. First, the silicon layer formed on the silicon oxide layer on top of the SOI substrate is etched away except for a pattern of the optical waveguides by dry etching or other method, the remaining pattern of the optical waveguides acting as a core. Then, the cladding layer of $SiO_2$ is formed by CVD (Chemical Vapor Deposition) such that the cladding layer of $SiO_2$ surrounds the remaining pattern of the optical waveguides. The cladding layer of $SiO_2$ may be formed at least to a thickness substantially equal to the thickness of the remaining silicon layer (the remaining pattern of the optical waveguides), and not be formed to a thickness such that the cladding layer goes over the pattern of optical waveguides to fully coat it. In this way, in the illustrative embodiment, the pattern structure for the optical waveguide is formed in one processing step.

As shown in FIG. 1, the pattern structure includes a first optical waveguide 18, a second optical waveguide 20 and an intermediary optical waveguide 16. In the illustrative embodiment, since the pattern structure for the optical waveguide is formed in one processing step, the first optical waveguide 18, second optical waveguide 20 and intermediary optical waveguide 16 are formed as one layer on the silicon substrate 10.

The first optical waveguide 18 has its one end connected to an input waveguide 19 for receiving a light 24 having a second wavelength. The input waveguide 19 is configured to receive the light 24 such as an output light emitted from a laser diode for outputting optical signals for transmission, for example. The first optical waveguide 18 has its other end forming an input-output end to which a light 22 having a first wavelength is input and from which the light 24 having the second wavelength is output.

The second optical waveguide 20 has its one end connected to an output waveguide 21 for outputting the light 22 having the first wavelength. The output waveguide 21 is configured to output the light 22, specifically a light signal, to provide it to a photodiode. Between the first and second optical waveguides 18 and 20, the intermediary optical waveguide 16 is arranged.

In the wavelength-selective path-switching element 1, one combination of the first optical waveguide 18 and the intermediary optical waveguide 16 forms a first optical directional coupler, and the other combination of the intermediary optical waveguide 16 and the second optical waveguide 20 forms a second optical directional coupler.

Figure 2:
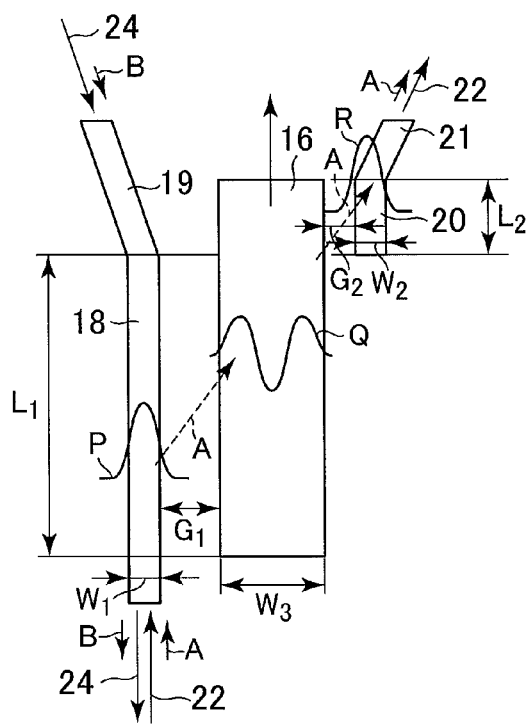
FIG. 2 is a top plan view schematically showing a pattern of optical waveguides constituting the wavelength-selective path-switching element shown in FIG. 1.

As shown in FIG. 2, the first optical waveguide 18, the second optical waveguide 20 and the intermediary optical waveguide 16 have widths of $W_1$, $W_2$ and $W_3$, respectively.

The width $W_1$ of the first optical waveguide 18 is conformed to meet a requirement that the light 22 of the first wavelength and the light 24 of the second wavelength propagate in a single mode. The width $W_2$ of the second optical waveguide 20 is conformed to meet a requirement that the light 22 of the first wavelength propagates in a single mode. The width $W_3$ of the intermediary optical waveguide 16 is conformed to meet a requirement that the light 22 of the first wavelength and the light 24 of the second wavelength propagate in multiple modes. The width $W_1$ of the first optical waveguide 18, the width $W_2$ of the second optical waveguide 20 and the width $W_3$ of the intermediary optical waveguide 16 are also confirmed to meet a requirement that the light 22 of the first wavelength propagates on these optical waveguides at uniform effective refractive index in their propagation mode.

In the illustrative embodiment, the light propagates on the first optical waveguide 18, intermediary optical waveguide 16 and second optical waveguide 20. As described above, since the widths $W_1$, $W_2$ of the first and second optical waveguides 18, 20 are conformed such that they have the light propagating in a single mode, the amplitude distribution P of the lights 22, 24 has only one extremal value at substantially the lateral cross-sectional center of the optical waveguide 18, and the amplitude distribution R of the light 22 has only one extremal value at substantially the lateral cross-sectional center of the optical waveguide 20. Accordingly, in each of the optical waveguides 18 and 20, the light propagates in a single mode.

Contrarily, in the case where the width $W_3$ of the intermediary optical waveguide 16 is conformed such that it has the light propagating in multiple modes, the amplitude distribution Q of the lights 22, 24 has two or more extremal values in the optical waveguide 16. In the figure, an example is shown where the amplitude distribution Q has three extremal values.

As shown in FIG. 2, the first optical waveguide 18 and intermediary optical waveguide 16 are formed to be close and parallel to each other at a distance $G_1$ over a length of $L_1$. The intermediary optical waveguide 16 and second optical waveguide 20 are similarly formed to be close and parallel to each other at a distance $G_2$ over a length of $L_2$.

The length $L_1$ and the distance $G_1$ are conformed to meet a requirement that the light 22 of the first wavelength is transmitted to the intermediary optical waveguide 16 from the first optical waveguide 18 but the light 24 of the second wavelength is not. The distance $G_1$ is also set to a value for defining an area (evanescent field) where the optical electric-field of the light 22 propagating on the first optical waveguide 18 or the intermediary optical waveguide 16 leaks out from the core. The length $L_2$ and the distance $G_2$ are conformed to meet a requirement that the light 22 of the first wavelength is transmitted to the second optical waveguide 20 from the intermediary optical waveguide 16.

In the illustrative embodiment, the length $L_1$ is set to be equal to a coupling-length which is propagated distance at the time when the maximum amount of the energy of the optical electric-field of the light 22 is moved to the intermediary optical waveguide 16. More specifically, when the light 22 of the first wavelength propagates on the first optical waveguide 18 in the direction of an arrow A in a single mode, the energy of the optical electric-field of the light 22 gradually moves to the intermediary optical waveguide 16 and the maximum amount of the energy of the optical electric-field of the light 22 of the first wavelength moves to the intermediary optical waveguide 16 at the coupling-length. The energy of the optical electric-field then is transmitted again from the intermediary optical waveguide 16 to the first optical waveguide 18 because the intermediary optical waveguide 16 is formed in parallel with the first optical waveguide 18 nearby at the small distance $G_1$ and has the same effective refractive index as the first optical waveguide 18. That is to say, over the coupling-length, the optical energy moves from the first optical waveguide 18 to the intermediary optical waveguide 16 and vice versa alternately. Accordingly, by setting the value of $L_1$ to an odd multiple of the coupling-length, it is possible to obtain the maximum amount of the energy of the optical electric-field of the light 22 of the first wavelength in the intermediary optical waveguide 16. The value of $L_1$ is preferably equal to the coupling-length, whereby it is possible to reduce the size of the wavelength-selective path-switching element to make it smaller.

The same principles can be applied to the length $L_2$ and distance $G_2$ between the intermediary optical waveguide 16 and the second optical waveguide 20 which form the second optical directional coupler. Specifically, in the illustrative embodiment, the length $L_2$ is equal to a coupling-length of the second optical directional coupler, and the distance $G_2$ is set to a value for defining an area (evanescent field) where the optical electric-field of the light 22 propagating on the second optical waveguide 20 or intermediary optical waveguide 16 leaks away.

For mounting the wavelength-selective path-switching element in an ONU or OLT, the element may be so designed as to interchange the light 22 of the first wavelength and the light 24 of the second wavelength with each other in operation. Specifically, in the case when the wavelength-selective path-switching element is mounted in an OLT, the first and second wavelengths of light are interchanged with each other in contradistinction to the case when the wavelength-selective path-switching element is mounted in an ONU.

Figure 3:
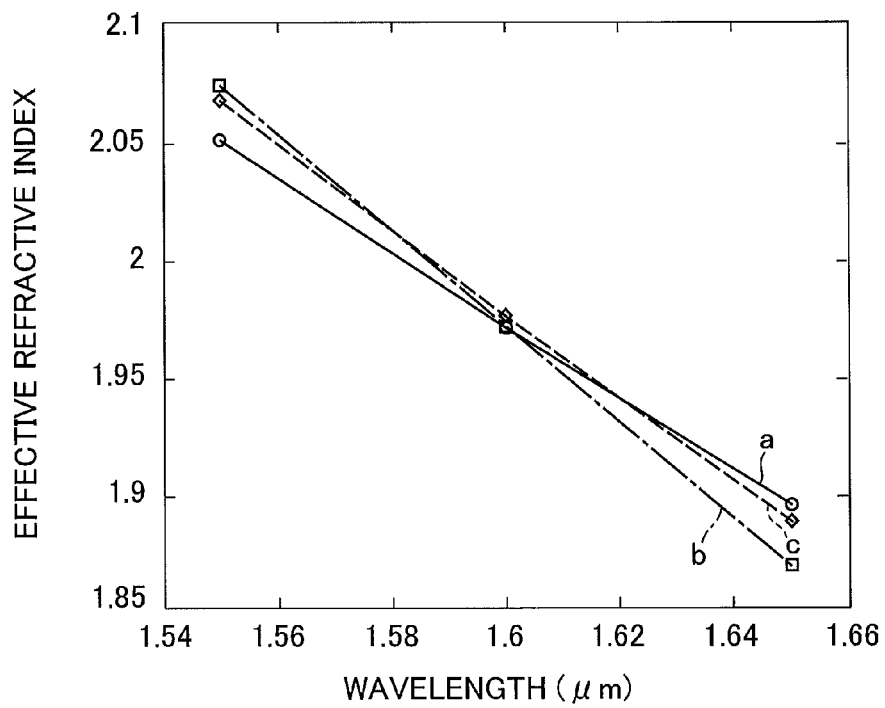
FIG. 3 is a graph plotting equivalent refractive indexes of first, second and intermediary optical waveguides shown in FIGS. 1 and 2.

Now, reference will be made to FIG. 3 to describe the result of simulations, and specifically to describe the effective refractive indices of the first optical waveguide 18, the second optical waveguide 20 and the intermediary optical waveguide 16 shown in FIGS. 1 and 2. In FIG. 3, the horizontal axis of the graph represents wavelength plotted in micrometers (μm) and the horizontal axis of the graph represents effective refractive index.

In this simulation, each of the first and second optical waveguides 18, 20 has a core of Si and is the optical waveguide of a single mode. The first and second optical waveguides 18, 20 also are square, in cross section, 300 nm on a side ($W_1$, $W_2$), respectively. The intermediary optical waveguide 16 has a core made of Si and is a rectangle in cross-section having a thickness T, in FIG. 1 of 300 nm. In the illustrative embodiment, the simulations are done in two kinds of widths ($W_3$ in FIG. 2) of the intermediary optical waveguide 16, one width $W_3$ being 1340 nm and the other width $W_3$ being 645 nm.

In the simulation, the effective refractive indexes in the first and second optical waveguide 18, 20 are calculated and plotted by circles, through which a solid line a is drawn as shown in FIG. 3. Also, the effective refractive indexes in the intermediary optical waveguide 16 having the thickness of 300 nm and width $W_3$ of 1340 nm are calculated and plotted by squares, through which an alternate long and short dash line b is drawn; and the effective refractive indexes in the intermediary optical waveguide 16 having the thickness of 300 nm and the width $W_3$ of 645 nm are calculated and plotted by diamonds, through which a chain line c is drawn.

From the figure, it can be seen that the effective refractive indexes become substantially identical to each other at wavelength 1.6 μm even in the optical waveguides 16, 18, 20 having the different waveguide widths. Therefore, by setting the first wavelength of the light 22 to 1.6 μm, it is possible to have the light 22 of the first wavelength entering into the first optical waveguide 18, then propagating sequentially on the first optical waveguide 18, intermediary optical waveguide 16 and second optical waveguide 20, and emerging from the output waveguide 21 connecting to the second optical waveguide 20.

Also, by setting the second wavelength of the light 24 to a value different from 1.6 μm, it is possible to have the light 24 of the second wavelength entering into the input waveguide 19 connecting to the first optical waveguide 18 and then emerging from the first optical waveguide 18 without propagating on the intermediary optical waveguide 16 or the second optical waveguide 20.

Figure 4:
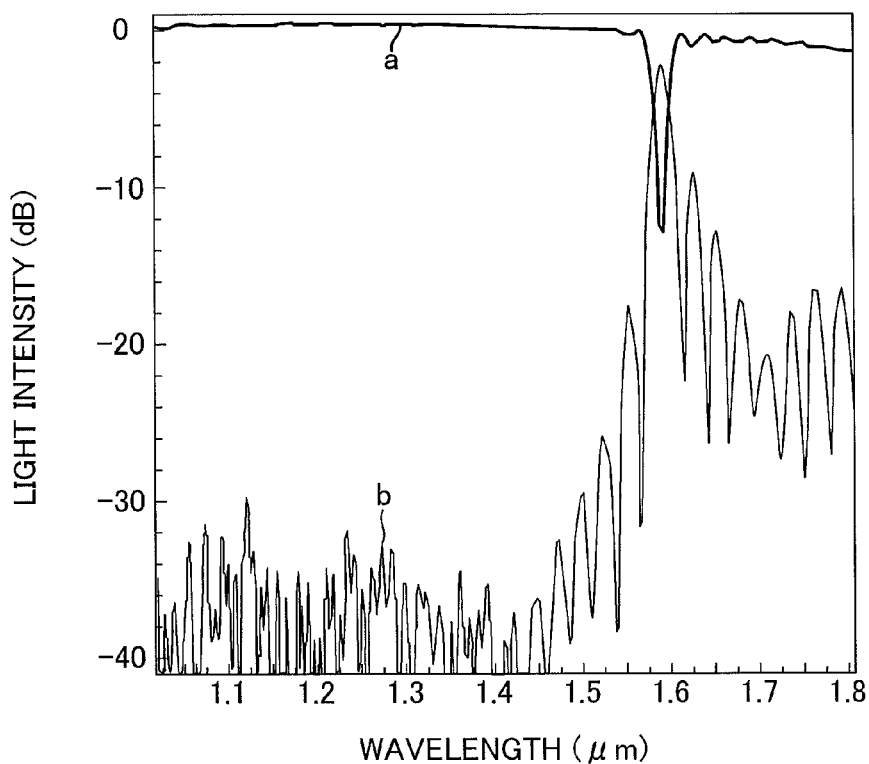
FIG. 4 is a graph plotting the wavelength dependency of the switching function in the wavelength-selective path-switching element shown in FIGS. 1 and 2.

Next, reference will be made to FIG. 4 to describe the dependency of the switching function on wavelength in the wavelength-selective path-switching element 1. FIG. 4 shows intensity of light at every wavelength as the result of a simulation done to the wavelength-selective path-switching element 1 under the condition where $W_1$=300 nm, $G_1$=750 nm, $L_1$=95 μm, $W_2$=1340 nm, $G_2$=220 nm, and $L_2$=20 μm, by using a three-dimensional FDTD (Finite Difference Time Domain) method. In FIG. 4, the horizontal axis of the graph represents wavelength plotted in micrometers (μm) and the horizontal axis of the graph represents light intensity in dB (decibel).

In the simulation, lights of wavelengths of 1.0 to 1.8 μm enter, respectively, into the input waveguide 19 and propagates on the first optical waveguide 18 to emerge from the input-output end of the first optical waveguide 18 as indicated by the arrow B in FIG. 2, and into the input-output end of the first optical waveguide 18 and propagates sequentially on the first optical waveguide 18, intermediary optical waveguide 16, and second optical waveguide 20 to emerge from the output waveguide 21 as indicated by the arrow A in the figure. In FIG. 4, the intensities of the lights emerging from the input-output end of the first optical waveguide 18 and from the output waveguide 21 are represented by curves a and b, respectively.

From FIG. 4, it can be seen that, at the wavelength 1.6 μm, the intensity of light emerging from the input-output end of the first optical waveguide 18 reaches its lowest value as indicated by the curve a whereas the intensity of light emerging from the output waveguide 21 reaches its highest value as indicated by the curve b. This means that by setting the first wavelength the light 22 to 1.6 μm, it is possible to have the light 22 entering into the input-output end of the first optical waveguide 18, then propagating sequentially on the first optical waveguide 18, intermediary optical waveguide 16 and second optical waveguide 20 and exiting from the output waveguide 21. Also, by setting the second wavelength of the light 24 to a value deviating from 1.6 μm, it is possible to have the light 24 entering into the input waveguide 19, then propagating on the first optical waveguide 18 and exiting from the input-output end of the first optical waveguide 18.

Accordingly, in the case where the first wavelength is set to 1.6 μm and determined as the wavelength of optical downstream signals, and the second wavelength is set to a value deviating from 1.6 μm and determined as the wavelength of optical up-stream signals, it is possible to implement a suitable wavelength-selective path-switching element for the ONU or the OLT in a PON communication system. Also, in the wavelength-selective path-switching element according to the invention, in order to select light of a certain wavelength, there are two steps, i.e. the first step is for shifting the light from the first optical waveguide 18 to the intermediary optical waveguide 16, and the second step is for shifting the light from the intermediary optical waveguide 16 to the second optical waveguide 20, whereby even when a part of other wavelength of light shifts from the first optical waveguide 18 to the intermediary optical waveguide 16, it is possible to have the most of the light of other wavelength remaining in the intermediary optical waveguide 16 during the second step for shifting the light of good wavelength from the intermediary optical waveguide 16 to the second optical waveguide 20. Therefore, it is possible to preclude a possibility of existence of the other wavelength of light in the second optical waveguide 20 and to improve the extinction ratios relative to other wavelength.

Figure 5A:
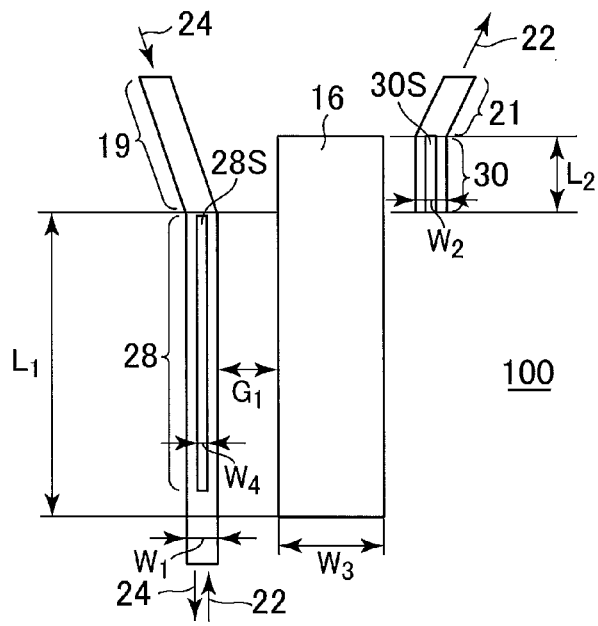
FIGS. 5A and 5B are schematics perspective views showing wavelength-selective path-switching elements according to an alternative embodiment of the invention.
Figure 5B:
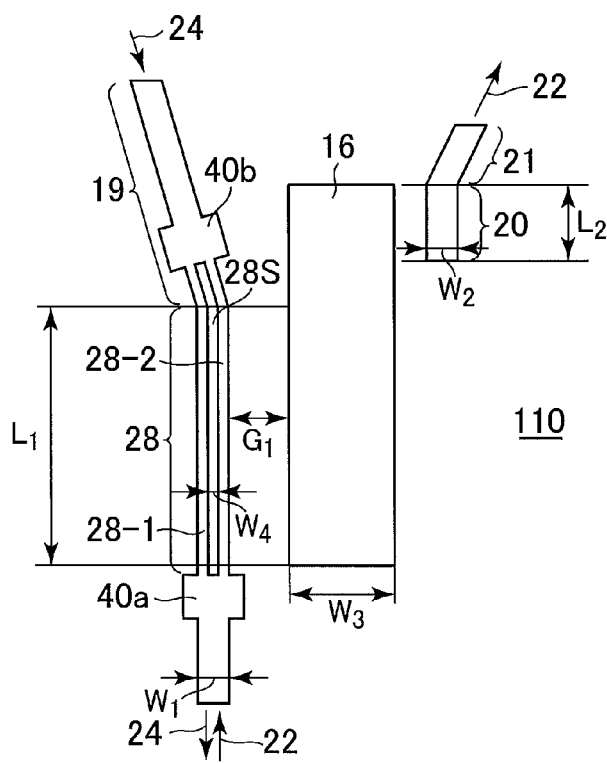

Reference will be made to FIGS. 5A and 5B to describe wavelength-selective path-switching elements 100, 110 according to the alternative embodiment. They can be fabricated by using substantially the same method as the wavelength-selective path-switching 100 described above, and hence repetitive descriptions thereon will be refrained from.

Each of FIGS. 5A and 5B shows, like FIG. 1, an optical waveguide pattern for constituting the wavelength-selective path-switching element. The optical waveguide pattern includes a first optical waveguide 28, a second optical waveguide 30 (or 20) and the intermediary optical waveguide 16. The first optical waveguide 28 has its one end connected to the input waveguide 19 for receiving the light 24 having the second wavelength. The first optical waveguide 28 has its other end forming an input-output end to which the light 22 having the first wavelength is input and from which the light 24 having the second wavelength is output. The second optical waveguide 20 has its one end connected to the output waveguide 21 for outputting the light 22 having the first wavelength. Between the first and second optical waveguides 28 and 30 (or 20), the intermediary optical waveguide 16 is arranged.

As shown in FIG. 5A, the first optical waveguide 28 has a slotted portion 28S at the center of the core. The slotted portion 28S extends in the direction of propagation and has a refractive index lower than the core. The second optical waveguide 30 also has a slotted portion 30S which is partly similar to the slotted portion 28S. The second optical waveguide 20 may have no slotted portion as shown in FIG. 5B. In the following, the optical waveguide having the slotted portion will also be referred to as a slotted optical waveguide.

The first optical waveguide 28, in FIG. 5B, having the slotted portion 28S at the center of the core also has two parallel optical waveguides 28-1 and 28-2 as well as MMI (Multi-Mode Interference) couplers 40a and 40b. The MMI (Multi-Mode Interference) couplers 40a and 40b are arranged, respectively, at the ends of parallel optical waveguides 28-1 and 28-2 as shown in FIG. 5B, and have function of combining and splitting the light propagating on the parallel optical waveguides 28-1 and 28-2. In the first optical waveguide 28 of FIG. 5B, thanks to the parallel optical waveguides 28-1 and 28-2 as well as the MMI couplers 40a and 40b, it is possible to sharpen the wavelength dependency of the effective refractive index in the propagation mode with respect to the light propagating on the first optical waveguide 28 as described later. Therefore, the wavelength dependency of the effective refractive index in the propagation mode of the light propagating on the first optical waveguide 28 and intermediary optical waveguide 16 shown in FIG. 5B is grater than the wavelength dependency of the effective refractive index in the propagation mode of the light propagating on the first optical waveguide 28 and intermediary optical waveguide 16 shown in FIG. 5A. Thus the first optical waveguide 28 and intermediary optical waveguide 16 shown in FIG. 5B can have the improved function of selecting wavelength and increase in performance of the wavelength filter.

Figure 6:
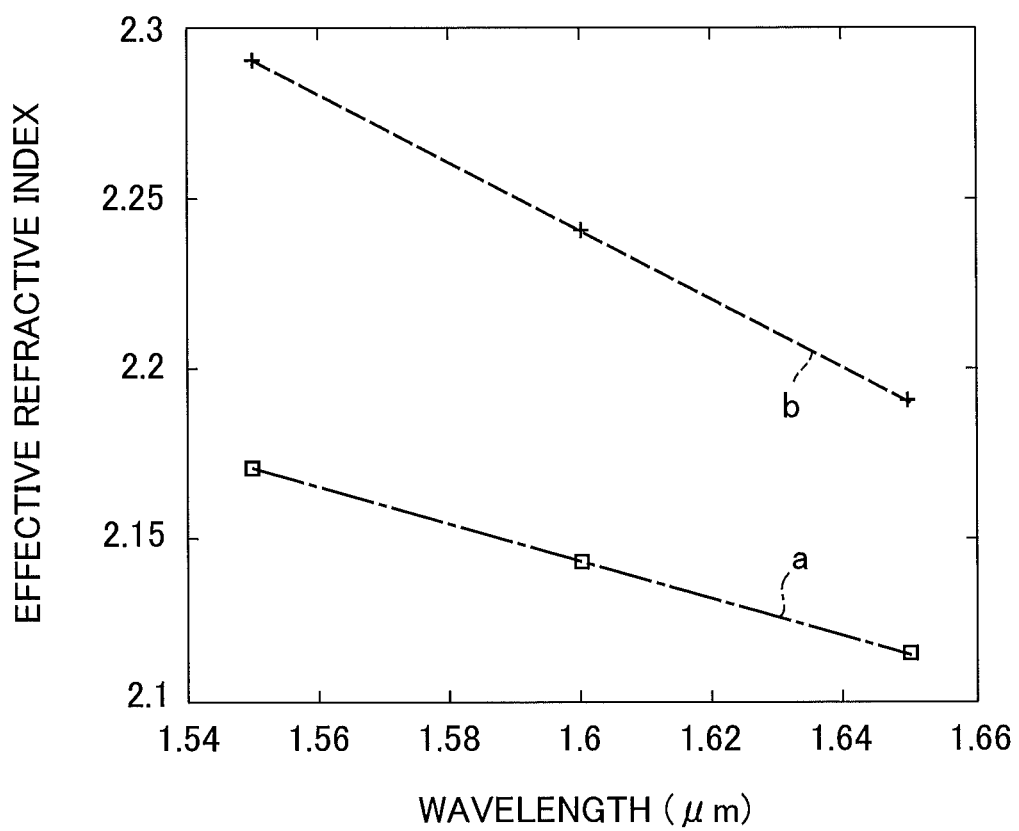
FIG. 6 is a graph plotting the dependency of the effective refractive indices in the propagation modes in the wavelength-selective path-switching element shown in FIG. 5A.

Now, reference will be made to FIG. 6 to describe the wavelength dependency of the effective refractive index in a propagation mode in a slotted optical waveguide. FIG. 6 shows the result of a simulation under the situation where the slotted optical waveguide has a width of 600 nm and the slotted portion has a width of 300 nm. In the figure, the horizontal and vertical axes indicate wavelength in micrometers ($\mu$m) and effective refractive index, respectively.

In FIG. 6, the effective refractive index in the zeroth propagation mode in the slotted optical waveguide is indicated by small black squares and a broken line a connecting the black squares. In the figure, the effective refractive index is calculated. For comparison, the calculated effective refractive index in the third propagation mode (odd-order propagation mode) in an optical waveguide, such as the intermediary optical waveguide 16, having a waveguide width of 1.3 $\mu$m is also indicated by crosses and a broken line b connecting the crosses.

From the figure, it is understood that the effective refractive index in the zeroth propagation mode in the non-slotted optical waveguide, that is the first optical waveguide 18 in the wavelength-selective path-switching element 1, is greater than the effective refractive index in the zeroth propagation mode in the slotted optical waveguide, and specifically is the values between the broken lines a and b. Therefore, the difference of the effective refractive index of the slotted optical waveguide with the effective refractive index of the intermediary optical waveguide which is a multimode optical waveguide has larger wavelength dependency than the difference with the effective refractive index of the normal optical waveguide.

Thus, the wavelength-selective path-switching elements 100 and 110 having the slotted optical waveguide as a first optical waveguide have sharper wavelength selectivity and have improved function as a wavelength filter than the wavelength-selective path-switching element 1 having no slotted optical waveguide. Specifically, the wavelength-selective path-switching elements 100 and 110 can narrow a wavelength region in which the wavelength is switched and thus enhance the wavelength selectivity as shown FIGS. 7A and 7B.

Figure 7A:
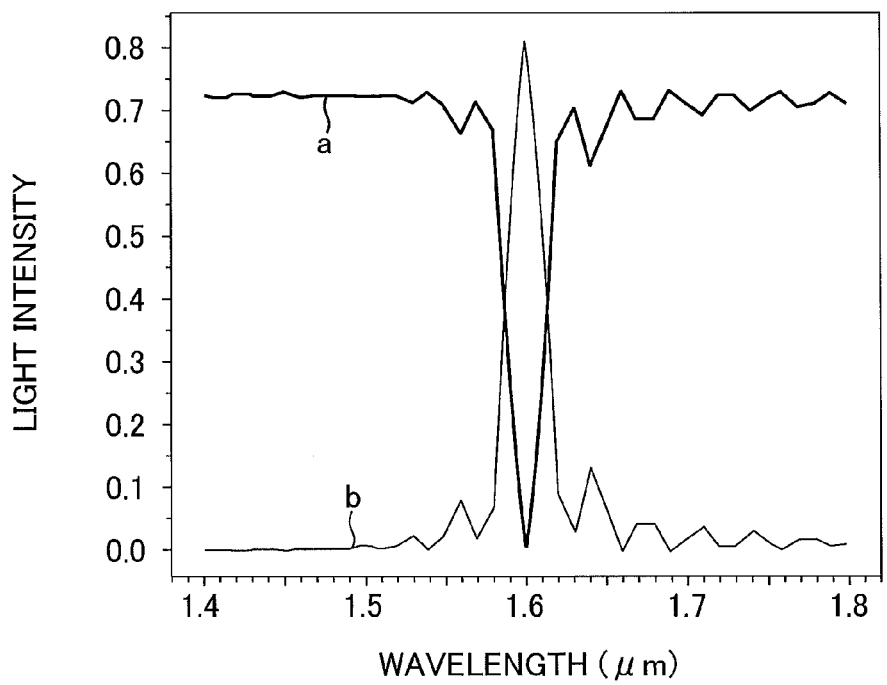
FIG. 7A is a graph plotting the wavelength selectivity of the wavelength-selective path-switching element shown in FIG. 5A.
Figure 7B:
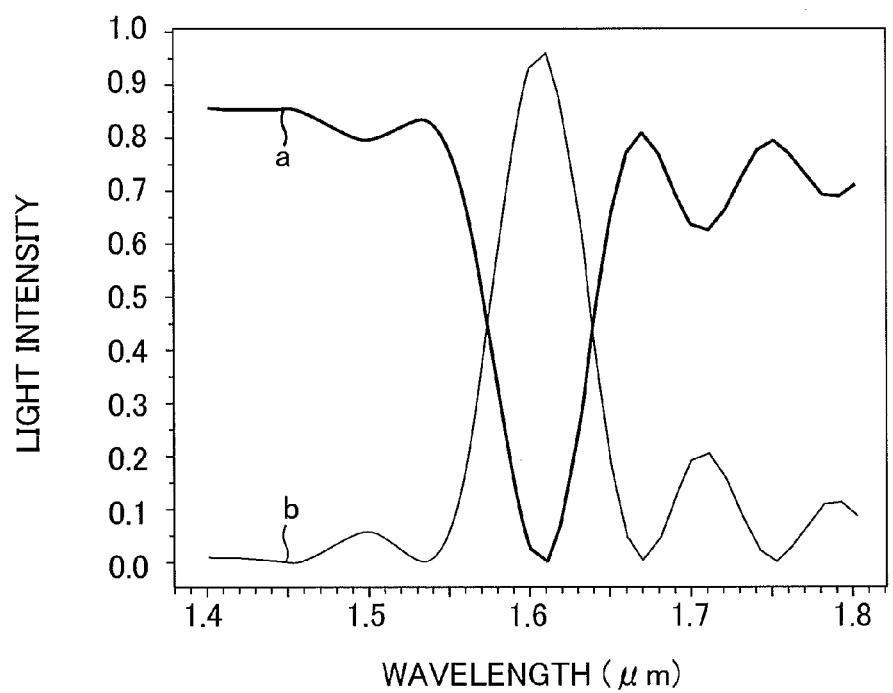
FIG. 7B is a graph plotting the wavelength selectivity of the wavelength-selective path-switching element shown in FIG. 1.

FIGS. 7A and 7B are graphs for use in explaining the wavelength selectivity of the wavelength-selective path-switching elements 1, 100, 110 and show the results of simulations performed respectively in the wavelength-selective path-switching element 100 or 110 having the slotted optical waveguide such as the slotted optical waveguide 28 and in the wavelength-selective path-switching element 1 having no slotted optical waveguide such as the optical waveguide 18 by using a Beam Propagation Method (BPM). In FIG. 7A, the simulation is performed under condition where $W_1$=500 nm, $G_1$=465 nm, $L_1$=95 $\mu$m, $W_2$=2130 nm and slot width=200 nm, whereas in FIG. 7B, the simulation performed under condition where $W_1$=280 nm, $G_1$=385 nm, $L_1$=95 $\mu$m and $W_2$=2690 nm. In each of FIGS. 7A and 7B, the horizontal and vertical axes indicate wavelength in micrometers ($\mu$m) and light intensity on a linear scale, respectively.

In FIG. 7A, the intensity of light output from the input-output end of the first optical waveguide 28 when the light is entered into the waveguide 28 is indicated by the curve a, and the intensity of light output from the output waveguide is indicated by the curve b. Note that the wavelength-selective path-switching element 110 has the same simulation result as the wavelength-selective path-switching element 100, so that the one result is shown in FIG. 7A. In FIG. 7B, the intensity of light output from the input-output end of the first optical waveguide 18 when the light is entered into the waveguide 18 is indicated by the curve a, and the intensity of light output from the output waveguide 21 is indicated by the curve b.

From the figures, it can be understood that, at wavelength 1.6 $\mu$m, the respective intensities of light output from the input-output end of the first optical waveguide 28 and 18 indicated by the curves a decreases to a local minimum whereas the respective intensities of light output from the output waveguide 21 indicated by the curves b assumes its local maximum value. They are, however, different in half-value widths of the curves a and b, respectively, at wavelength 1.6 $\mu$m. Specifically, shown in FIG. 7A, the half-value width for the wavelength-selective path-switching element with the slotted optical waveguide is smaller than (about one-third) the half-value width for the wavelength-selective path-switching element 1 shown in FIG. 7B. Therefore, from the figures, it can be understood that the wavelength-selective path-switching element with the slotted optical waveguide has a narrower wavelength bandwidth where the wavelength is switched than the wavelength-selective path-switching element with no slotted optical waveguide. Thus the wavelength-selective path-switching element with the slotted optical waveguide has enhanced wavelength selectivity.

Note that the half-value widths of the curves a and b respectively indicating the local minimum and maximum values are in proportion to the length $L_1$ of the area where the first optical waveguide (first optical waveguide 28 in FIG. 7A or first optical waveguide 18 in FIG. 7B) is close and parallel to the intermediary optical waveguide 16 with the spacing $G_1$ therebetween as shown in FIGS. 5 and 2. In this simulation, the length $L_1$ is set equal for both path-switching elements 1 and 100 so that it also can be understood that, by using the slotted optical waveguide as the first optical waveguide, even when the length of the slotted optical waveguide is reduced to one-third, the optical waveguide can achieve the same wavelength-selecting characteristics as the first optical waveguide with no slot, and that the slotted optical waveguide therefore contributes to a decrease in the size of the wavelength-selective path-switching element itself.

Well, reference will be made to FIGS. 8A and 8B to describe wavelength-selective path-switching elements 200, 210 according to another alternative embodiment. They can be fabricated by using substantially the same method as the wavelength-selective path-switching 100 described above, and hence repetitive descriptions thereon will be refrained from.

In the wavelength-selective path-switching elements 200, 210, the width of the first optical waveguide 32 varies in the direction of propagation. In the illustrative embodiment, the width of the first optical waveguide 32 is so set that any portion that is identical in effective refractive index with the intermediary optical waveguide 16 is present anywhere in the first optical waveguide 32.

Figure 8A:
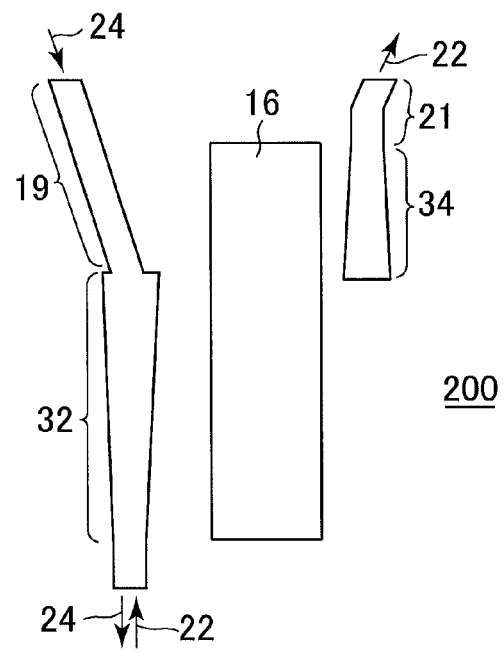
FIGS. 8A and 8B are schematics perspective views showing wavelength-selective path-switching elements according to another alternative embodiment of the invention.
Figure 8B:
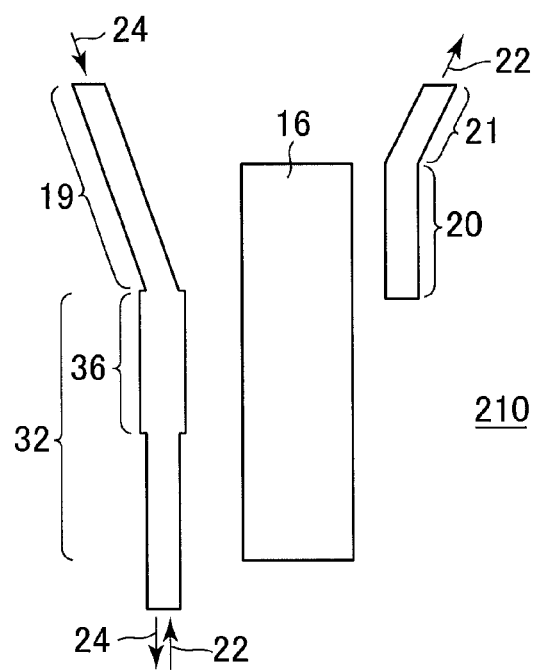

Specifically, as shown in FIG. 8A, the pattern of optical waveguides includes a first optical waveguide 32, a second optical waveguide 34 and the intermediary optical waveguide 16. To the first optical waveguide 32, the input waveguide 19 is connected for entering the light 24 of the second wavelength. The first optical waveguide 32 is formed to have the width gradually increased toward the junction with the input waveguide 19. Note that the first optical waveguide 32 may be formed to have the width gradually reduced toward the junction with the input waveguide 19, not shown, or be formed to have an optical subsidiary waveguide 36 of different width as shown in FIG. 8B. In this case, the width of the subsidiary waveguide 36 is so set that the effective refractive index at a width midway between the width of the subsidiary waveguide 36 and the width of the non-subsidiary portion of the first optical waveguide 32 is equal to the effective refractive index of the intermediary optical waveguide 16.

Referring again to FIG. 8A, the second optical waveguide 34 is also formed to have the width varied. The width of the second optical waveguide 34 is so set that any portion which is identical in effective refractive index with the intermediary optical waveguide 16 is present anywhere in the second optical waveguide 34. Note that the second optical waveguide may be formed in uniform width as denoted by reference numeral 20 in FIG. 8B. To the respective second optical waveguides 34 and 20, the output waveguide 21 is connected for outputting the light 22 of the first wavelength. These wavelength-selective path-switching elements have the wavelength characteristics as shown in FIGS. 9A and 9B.

Figure 9A:
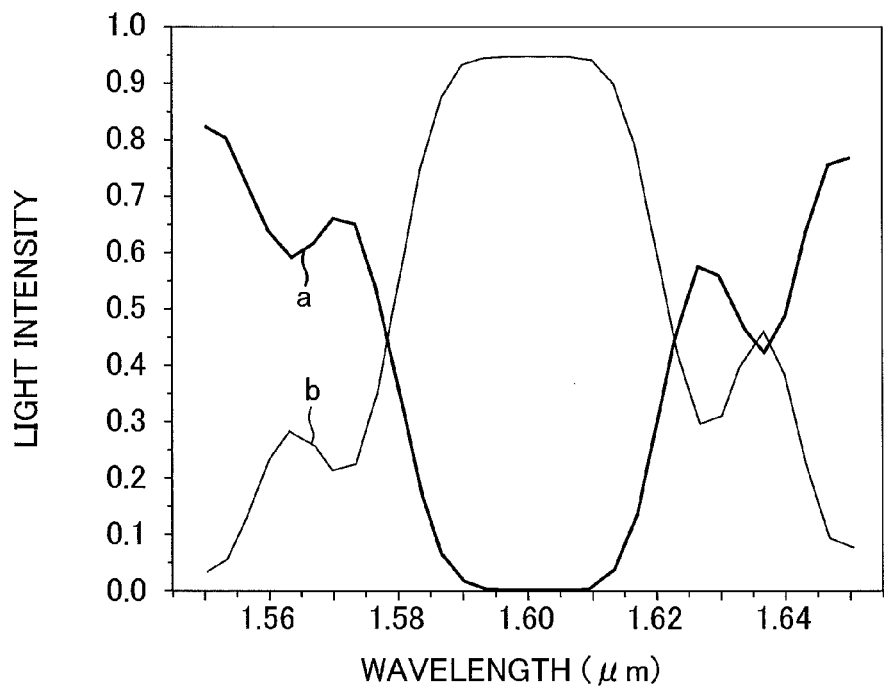
FIGS. 9A and 9B plot wavelength characteristics of the wavelength-selective path-switching elements shown in FIGS. 8A and 8B, respectively.
Figure 9B:
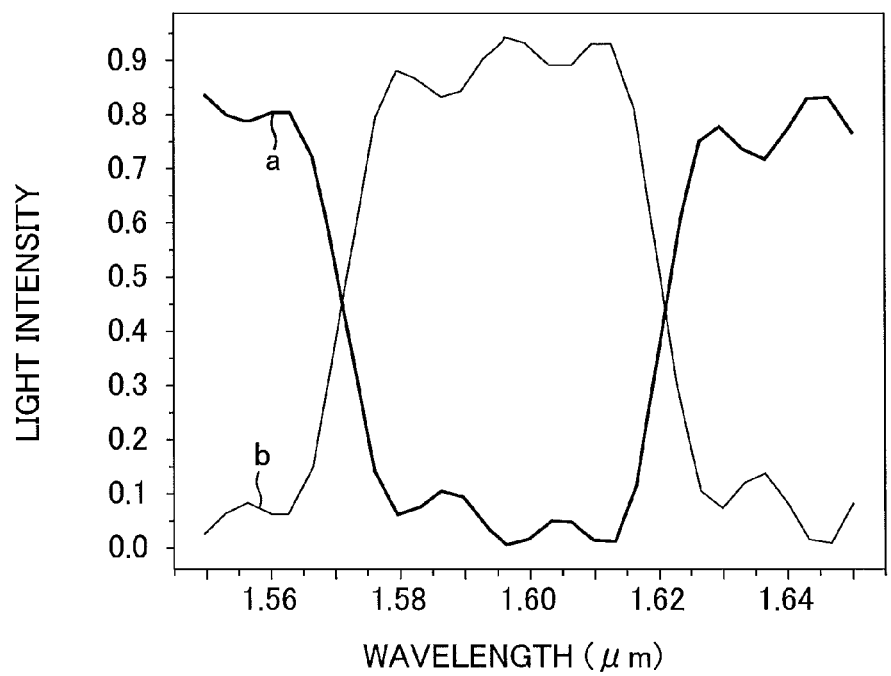

FIGS. 9A and 9B show the wavelength characteristics of the wavelength-selective path-switching elements 200 and 210, respectively. In each of the graphs of FIGS. 9A and 9B, the horizontal axis indicates wavelength in micrometers (μm) and the vertical axis indicates the intensity of light on a linear scale. The wavelength characteristics shown in FIGS. 9A and 9B are obtained by appropriately setting the shapes of the first optical waveguide 32, optical subsidiary waveguide 36, second optical waveguide 34 (or 20), and intermediary optical waveguide 16 as well as their arrangement.

In each of the graphs of FIGS. 9A and 9B, the intensity of light output from the input-output end of the first optical waveguide 32 when the light is entered into the waveguide 32 is indicated by the curve a, and the intensity of light output from the output waveguide 21 is indicated by the curve b.

From the figures, it can be understood that, at wavelength 1.6 μm, the intensity of light output from the input-output end of the first optical waveguide 32 indicated by the curve a decreases to a local minimum whereas the intensity of light output from the output waveguide 21 indicated by the curve b assumes its local maximum value, and that the half-value widths of the curves a and b are greater than those of the wavelength-selective path-switching elements 1, 100 and 110. The path-switching elements 200 and 210 therefore have a characteristic having a flat output in a selected wavelength range. This characteristic is important depending on how the wavelength-selective path-switching element is used.

Figure 10:
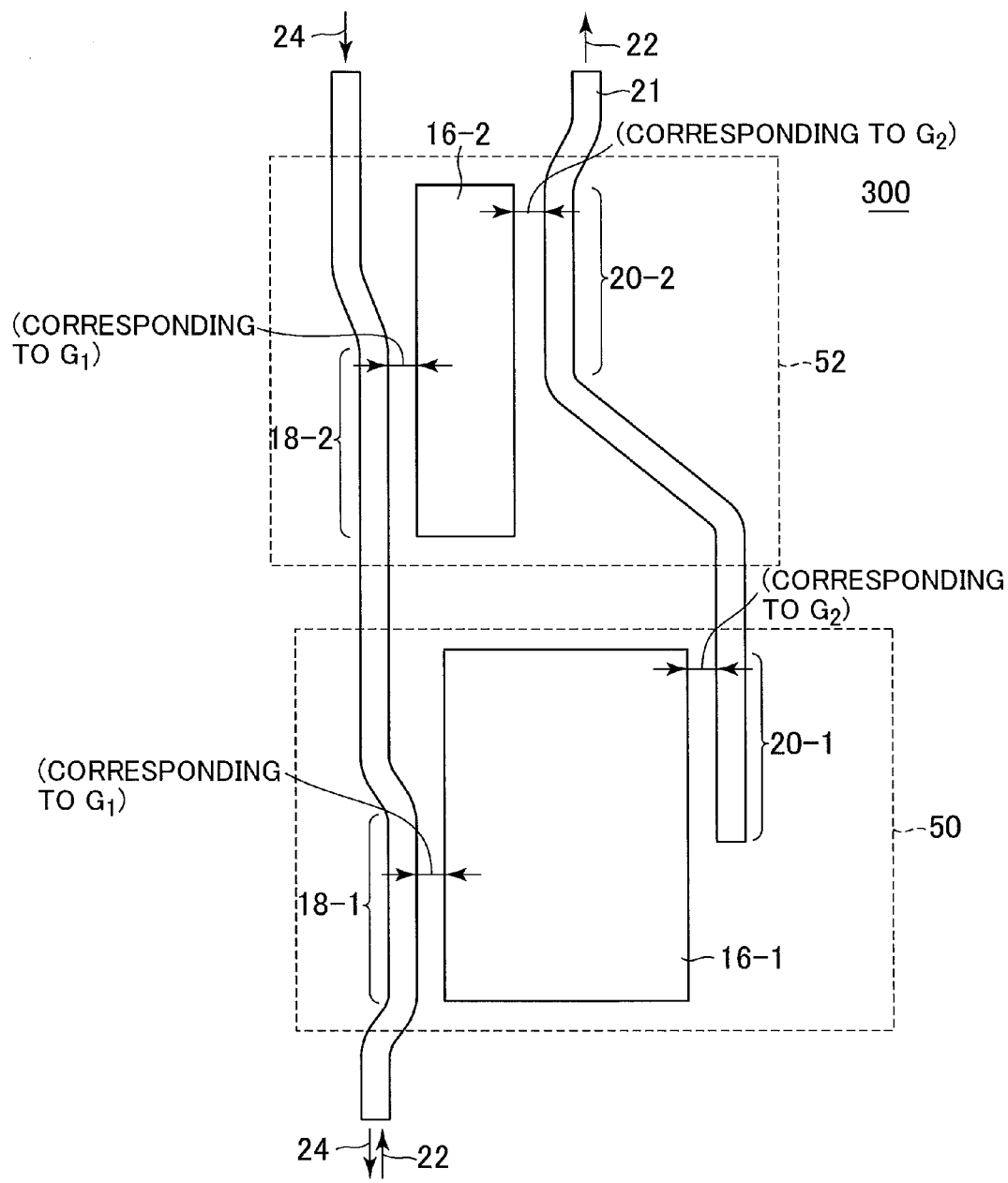
FIG. 10 is a schematics perspective view showing wavelength-selective path-switching element according to a still another alternative embodiment of the invention.

Reference will be made to FIG. 10 to describe a wavelength-selective path-switching element 300 according to another alternative embodiment. The wavelength-selective path-switching element 300 is characterized in that it includes a first path-switching portion 50 and a second path-switching portion 52 which are connected in series to each other. They are formed similarly to the aforementioned wavelength-selective switching elements 1, 100, 110 and 200 so that each of the portions 50 and 52 has the first optical waveguide, second optical waveguide, and intermediary optical waveguide. The first and second path-switching portions 50 and 52 thus have a function as a path-switching element for one of optical electric-fields where polarized wave of the light 22 of the first wavelength and polarized wave of the light 24 of the second wavelength are orthogonal to each other.

Specifically, as shown in FIG. 10, the wavelength-selective path-switching element 300 is configured to have a structure like the wavelength-selective switching element 1. The first path-switching portion 50 therefore has a first optical waveguide 18-1, a second optical waveguide 20-1, and an intermediary optical waveguide 16-1, and the second path-switching portion 52 has a first optical waveguide 18-2, a second optical waveguide 20-2, and an intermediary optical waveguide 16-2. Of course, the wavelength-selective path-switching element 300 may configured to have a structure like any one of the wavelength-selective switching elements 1, 100, 110, 200 and 210.

To one end of the respective first optical waveguides 18-1 and 18-2, an input-output waveguide is connected for entering and outputting light 22 of the first wavelength and light 24 of the second wavelength. The other end of the respective first optical waveguides 18-1 and 18-2 is connected with each other as shown in FIG. 10. Similarly, to one end of the respective second optical waveguides 20-1 and 20-2, an output waveguide is connected for outputting the light 22 of the first wavelength. As shown in FIG. 10, the other end of the respective second optical waveguides 20-1 and 20-2 is connected with each other. Such the wavelength-selective path-switching element 300 has wavelength dependency as shown in FIG. 11.

Figure 11:
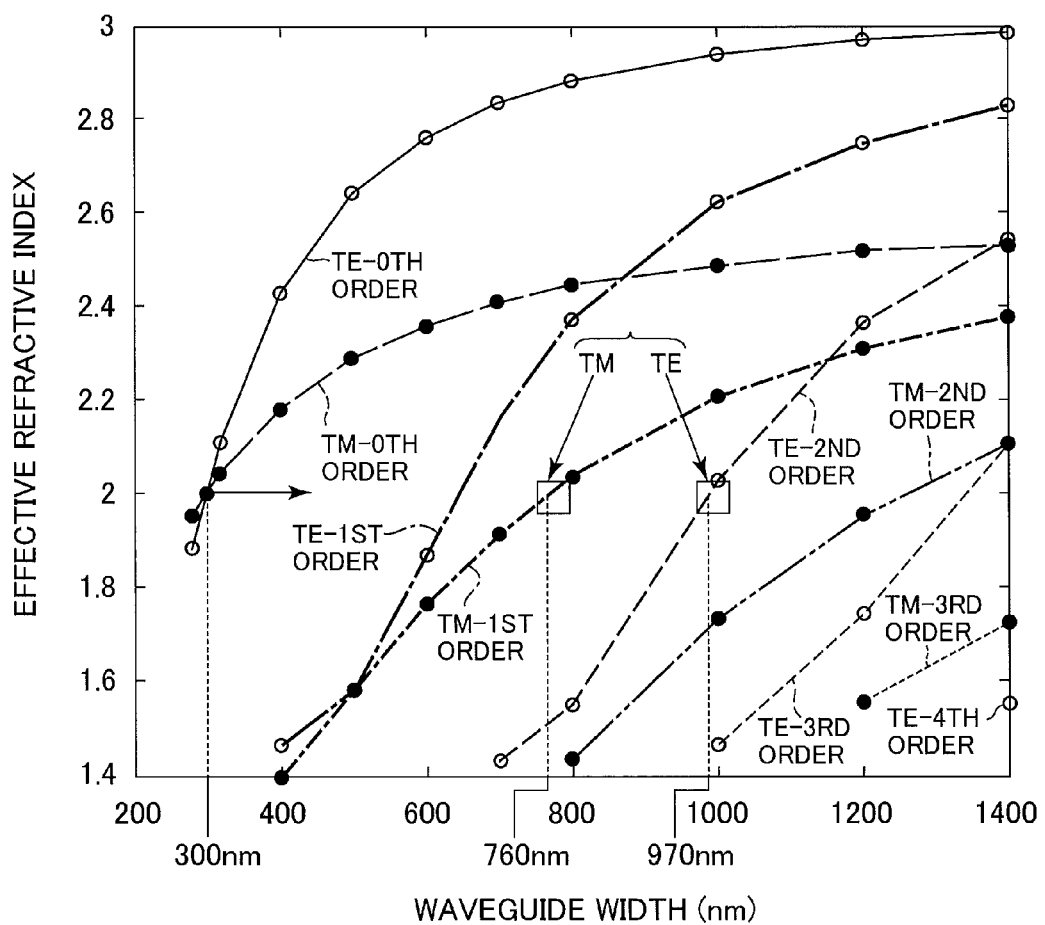
FIG. 11 is a graph plotting the dependency in propagation mode of the wavelength-selective path-switching element shown in FIGS. 10.

FIG. 11 is a graph for use in describing the wavelength dependency in the propagation mode by using a Finite Element Method (FEM). In FIG. 11, the horizontal axis of the graph indicates wavelength in micrometers (μm), and the vertical axis indicates effective refractive index. In FIG. 11, white circlets indicate the values of effective refractive index in the TE (Transverse Electric) mode, and black dots indicate the values of effective refractive index in the TM (Transverse Magnetic) mode. The orders in various modes are denoted as TE-0th order to TE-4th order and as TM-0th order to TM-3rd order.

The optical waveguide has its thickness set to 300 nm. The first optical waveguides 18-1, 18-2 have their width set to 300 nm, and the second optical waveguides 20-1, 20-2 have their width set to 300 nm. The multimode optical waveguide, which has the same effective refractive index in the zeroth order mode as the optical waveguide of 300 nm width, has its width set to 630 nm (first-order mode) and 970 nm (second-order mode) in TE mode, and set to 760 nm (first-order mode) in TM mode having an effective refractive index equal to that of the zeroth order mode of an optical waveguide having a width of 300 nm and a thickness of 300 nm is 630 nm (first-order mode) and 970 nm (second-order mode) in TE mode and 760 nm (first-order mode) in TM mode.

The intermediary optical waveguide 16-1 or 16-2 is formed as an optical waveguide having the same width as the width of those waveguides. In FIG. 11, the first order TM mode and second order TE mode are surrounded by squares. The characteristics of the effective refractive index in these modes are taken as one example in the following description of the wavelength dependency of the switching function of the wavelength-selective path-switching element 300, the description being provided by referring to FIGS. 12A and 12B.

The spacing (corresponding to $G_1$) between the first optical waveguide 18-1 and the intermediary optical waveguide 16-1, the spacing (corresponding to $G_2$) between the first optical waveguide 18-2 and the intermediary optical waveguide 16-2, the spacing (corresponding to $G_2$) between the second optical waveguide 20-1 and the intermediary optical waveguide 16-1, and the spacing (corresponding to $G_2$) between the second optical waveguide 20-2 and the intermediary optical waveguide 16-2 can be calculated based on the difference $\Delta n$ in effective refractive index between a propagation mode (even mode) in which the distribution of the optical electric-field is symmetric within each composite waveguide and a propagation mode (odd mode) in which the distribution is antisymmetric by regarding the combination of one first optical waveguide and a corresponding intermediary optical waveguide and the combination of one second optical waveguide and a corresponding intermediary optical waveguide as composite waveguides. That is, the difference $\Delta n$ in effective refractive index between even and odd modes is found as a function of the waveguide spacing. Accordingly, the length (corresponding to $L_1$) of the portion of the first optical waveguide (18-1 or 18-2) close and parallel to the intermediary optical waveguide (16-1 or 16-2) and the length (corresponding to $L_2$) of the portion of the second optical waveguide (20-1 or 20-2) close and parallel to the intermediary optical waveguide (16-1 or 16-2) are determined using the relationship, $L=\lambda/(2\Delta n)$, where $\lambda$ is the first or second wavelength.

Figure 12A:
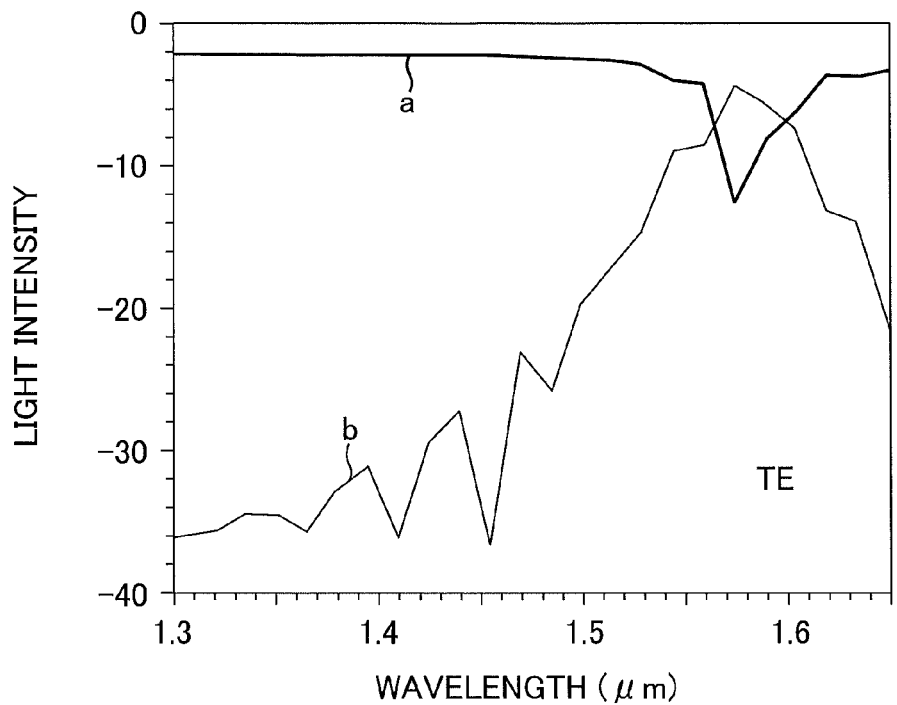
FIGS. 12A and 12B are graphs plotting the dependency of the effective refractive indices in the wavelength-selective path-switching element shown in FIG. 10 in transverse electric mode and transverse magnetic mode, respectively.
Figure 12B:
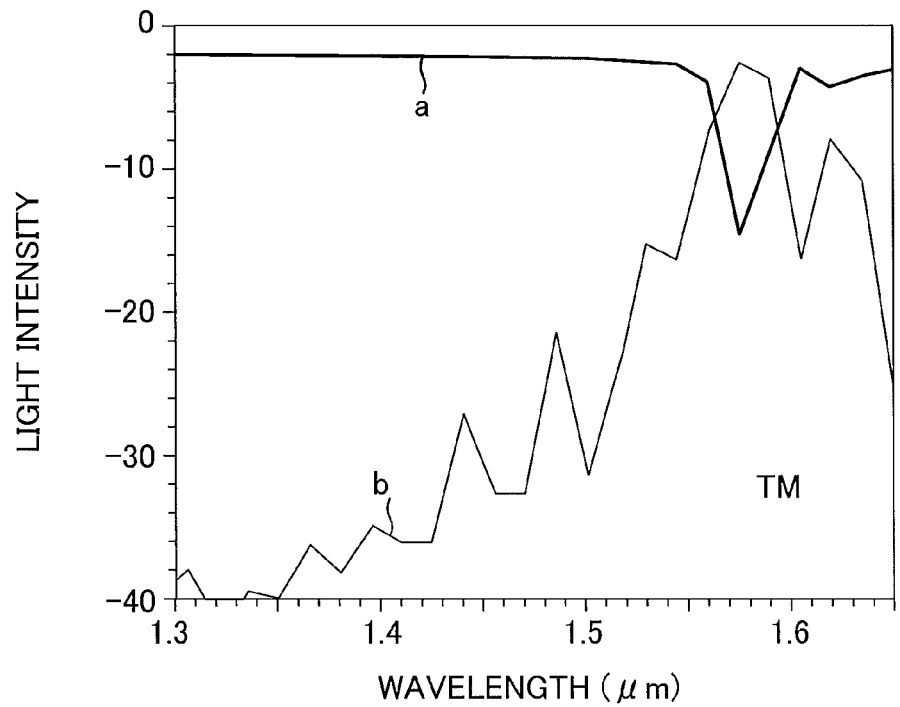

Next, reference will be made to FIGS. 12A and 12B for use in describing the wavelength dependency of the switching function in the wavelength-selective path-switching element 300. FIGS. 12A and 12B respectively show the result of the simulation by using a Beam Propagation Method (BPM). Specifically, FIG. 12A shows the wavelength dependency obtained on the assumption that first and second wavelengths of light propagate in the TE mode which is the second order TE mode surrounded by squares in FIG. 11. FIG. 12B shows the wavelength dependency obtained on the assumption that first and second wavelengths of light propagate in the TM mode which is the first order TM mode in FIG. 11. In each of the graphs of FIGS. 12A and 12B, wavelength is plotted in micrometers (μm) on the horizontal axis. Light intensity is plotted in dB on the vertical axis.

In each of the graphs of FIGS. 12A and 12B, the intensity of light output from the input-output end of the first optical waveguide 18 in the wavelength-selective path-switching element 300 when the light is entered from the first optical waveguide 18 is indicated by curve a, and the intensity of light output from the output waveguide 21 is indicated by curve b.

From the figures, it can be understood that, in both TE and TM modes, the path-switching occurs at wavelength 1577 nm and that the respective first and second path-switching portions 50 and 52 can be configured to have a function as path-switching element for one of optical electric-fields where polarized wave of the light 22 of the first wavelength and polarized wave of the light 24 of the second wavelength are orthogonal each other.

As described above, by connecting the first and second path-switching portion 50 and 52 in series, it is possible to implement a wavelength-selective path-switching element of polarization-independent type which is capable of switching the active optical path without depending on the polarizations of the first and second wavelengths of light.

The entire disclosure of Japanese patent application No. 2012-039575 filed on Feb. 27, 2012, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A wavelength-selective path-switching element comprising:
    a first optical waveguide;
    an intermediary optical waveguide; and
    a second optical waveguide arranged on opposite sides of said intermediary optical waveguide from said first optical waveguide,
    wherein said first optical waveguide and said intermediary optical waveguide are arranged substantially close to each other;
    wherein said intermediary optical waveguide and said second optical waveguide are arranged substantially close to each other;
    wherein said first optical waveguide is arranged to receive light of a first wavelength and to convey the light of the first wavelength to said intermediary optical waveguide;
    wherein said second optical waveguide is arranged to receive light of the first optical wavelength from said intermediary optical waveguide and to output the light of the first optical waveguide from said second optical waveguide; and
    wherein said first optical waveguide is further arranged to receive light of a second wavelength and to output the light of the second wavelength from said first optical waveguide.

2. The wavelength-selective path-switching device of claim 1, wherein:
    said first optical waveguide, said second optical waveguide, and said intermediary optical waveguide have widths of $W_1$, $W_2$, and $W_3$, respectively,
    said first optical waveguide and said intermediary optical waveguide are arranged substantially close and parallel to each other over a length of $L_1$ at a spacing of $G_1$,
    said intermediary optical waveguide and said second optical waveguide are arranged substantially close and parallel to each other over a length of $L_2$ at a spacing of $G_2$,
    the width $W_1$ of said first optical waveguide is so set that the light of the first wavelength and light of the second wavelength propagate on said first optical waveguide in a single mode,
    the width $W_2$ of said second optical waveguide is so set that the light of the first wavelength propagates on said second optical waveguide in a single mode,
    the width $W_3$ of said intermediary optical waveguide is so set that the light of the first wavelength and the light of the second wavelength propagate on said intermediary optical waveguide in multiple modes, the length $L_1$ and the spacing $G_1$ are so set that the light of the first wavelength entered into said first optical waveguide passes from said first optical waveguide into said intermediary optical waveguide, the length $L_2$ and the spacing $G_2$ are so set that the light of the first wavelength passes from said intermediary optical waveguide into said second optical waveguide, and the length $L_1$ and the spacing $G_1$ are so set that the light of the second wavelength entered into said first optical waveguide exits from said first optical waveguide.

3. The wavelength-selective path-switching device of claim 1, wherein said first optical waveguide includes a core with a slotted portion at a center of the core, said slotted portion extending in a direction of propagation and having a refractive index lower than the refractive index of a remaining portion of the core of the first optical waveguide.

4. The wavelength-selective path-switching device of claim 1, wherein said first optical waveguide has a width that varies in a direction of propagation.

5. A wavelength-selective path-switching element comprising:
   a first path-switching portion; and
   a second path-switching portion connected in series to said a first path-switching portion, each of said first and second path-switching portions including a first optical waveguide, an intermediary optical waveguide arranged substantially close to said first optical waveguide, and a second optical waveguide arranged on opposite sides of said intermediary optical waveguide from said first optical waveguide and substantially close to said intermediary optical waveguide;
   wherein each of said first and second path-switching portions is so configured that it functions as a path-switching element for one of optical electric-field components of first and second wavelengths of light which have directions of polarization perpendicular to each other;
   wherein each of said first optical waveguides is arranged to receive the light of the first wavelength and to convey the light of the first wavelength to said intermediary optical waveguides,
   wherein each of said second optical waveguides is arranged to receive the light of the first optical wavelength from one of said intermediary optical waveguides and to output the light of the first optical wavelength from one of said second optical waveguides, and
   wherein each of said first optical waveguides is further arranged to receive the light of the second wavelength entered into the other of said first optical waveguides and to output the light of the second optical wavelength from the one of first optical waveguide.

6. The wavelength-selective path-switching device of claim 5, wherein:
   said first optical waveguides, said second optical waveguides, and said intermediary optical waveguides have widths of $W_1$, $W_2$, and $W_3$, respectively,
   said first optical waveguides and said intermediary optical waveguides in said first and second path-switching portions are respectively arranged substantially close and parallel to each other over a length of $L_1$ at a spacing of $G_1$,
   said intermediary optical waveguide and said second optical waveguide in said first and second path-switching portions are respectively arranged substantially close and parallel to each other over a length of $L_2$ at a spacing of $G_2$, the width $W_1$ of said first optical waveguides is so set that the light of the first wavelength and light of the second wavelength propagate on said first optical waveguides in a single mode, the width $W_2$ of said second optical waveguides is so set that the light of the first wavelength propagates on said second optical waveguides in a single mode, the width $W_3$ of said intermediary optical waveguides is so set that the light of the first wavelength and the light of the second wavelength propagate on said intermediary optical waveguide in a single mode or in multiple modes, the length $L_1$ and the spacing $G_1$ are so set that the light of the first wavelength entered into the one of said first optical waveguides passes from said one of said first optical waveguides to said one of said intermediary optical waveguides, the length $L_2$ and the spacing $G_2$ are so set that the light of the first wavelength passes from said one of said intermediary optical waveguide to said one of said second optical waveguide, and the length $L_1$ and the spacing $G_1$ are so set that the light of the second wavelength entered into the other of said first optical waveguides exits from said other of said first optical waveguides.

7. The wavelength-selective path-switching device of claim 5, wherein each of said first optical waveguides includes a core with a slotted portion at a center of the core, said slotted portions extending in the direction of propagation and having a refractive index lower than the refractive index of a remaining portion of the respective core.

8. The wavelength-selective path-switching device of claim 5, wherein said first optical waveguides have a width that varies in a direction of propagation.

9. A wavelength-selective path-switching element, comprising:
   a first optical waveguide;
   an intermediary optical waveguide; and
   a second optical waveguide arranged on opposite sides of said intermediary optical waveguide from said first optical waveguide,
   wherein said first optical waveguide and said intermediary optical waveguide are arranged substantially close and parallel to each other,
   wherein said intermediary optical waveguide and said second optical waveguide are arranged substantially close and parallel to each other,
   wherein said wavelength-selective path-switching element is arranged to conduct light of a first wavelength that enters into said first optical waveguide and propagates on said first optical waveguide, said intermediary optical waveguide, and said second optical waveguide so that the light of the first wavelength exits from said second optical waveguide, and light of a second wavelength that enters into said first optical waveguide exits from said first optical waveguide, and
   wherein said first optical waveguide includes a core with a slotted portion at a center of the core, said slotted portion extending in the direction of propagation and having a refractive index lower than the refractive index of a remaining portion of the core.

10. A wavelength-selective path-switching element comprising:
    a first path-switching portion; and
    a second path-switching portion connected in series to said a first path-switching portion, said first and second path-switching portions each including a first optical waveguide, an intermediary optical waveguide arranged substantially close and parallel to said first optical waveguide, and a second optical waveguide arranged on opposite sides of said intermediary optical waveguide from said first optical waveguide and substantially close and parallel to said intermediary optical waveguide, wherein each of said first and second path-switching portions is so configured that it functions as a path-switching element for one of optical electric-field components of first and second wavelengths of light which have directions of polarization perpendicular to each other, wherein each said wavelength-selective path-switching element is arranged to conduct the light of the first wavelength that enters into one of said first optical waveguides and propagates on said first optical waveguides, said intermediary optical waveguides, and said second optical waveguides, the light of the first wavelength exiting from one of said second optical waveguides, and the light of the second wavelength enters into the other of said first optical waveguides and exits from the one of first optical waveguides, and wherein said first optical waveguides include a core with a slotted portion at a center of the core, said slotted portion extending in the direction of propagation and having a refractive index lower than the refractive index of a remaining portion of the core.

\* \* \* \* \*